(12) United States Patent
Kimura

(10) Patent No.: US 7,619,855 B2
(45) Date of Patent: Nov. 17, 2009

(54) STORAGE DEVICE, CARTRIDGE, AND CARTRIDGE MANUFACTURING METHOD

(75) Inventor: Koji Kimura, Meguro-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 771 days.

(21) Appl. No.: 10/567,651

(22) PCT Filed: Aug. 30, 2004

(86) PCT No.: PCT/JP2004/012865

§ 371 (c)(1),
(2), (4) Date: Feb. 9, 2006

(87) PCT Pub. No.: WO2005/024790

PCT Pub. Date: Mar. 17, 2005

(65) Prior Publication Data

US 2006/0262438 A1    Nov. 23, 2006

(30) Foreign Application Priority Data

Sep. 4, 2003   (JP) .............................. 2003-313079

(51) Int. Cl.
*G11B 5/00* (2006.01)
(52) U.S. Cl. ................................... 360/99.06
(58) Field of Classification Search ........................ None
See application file for complete search history.

(56) References Cited

U.S. PATENT DOCUMENTS 7,021,540 B2   4/2006   Kimura et al. .............. 235/441
7,275,963 B2 *  10/2007  Kurita ........................ 439/630

FOREIGN PATENT DOCUMENTS

| JP | 5-40921 | 6/1993 |
|---|---|---|
| JP | 5-166102 | 7/1993 |
| JP | 7-98619 | 4/1995 |
| JP | 9-114554 | 5/1997 |
| JP | 2002-352546 | 12/2002 |
| JP | 2003-31285 | 1/2003 |
| JP | 2003-173423 | 6/2003 |
| JP | 2003-173830 | 6/2003 |
| JP | 2003-196606 | 7/2003 |

* cited by examiner

*Primary Examiner*—Mark Blouin
(74) *Attorney, Agent, or Firm*—Fitzpatrick, Cella, Harper & Scinto

(57) ABSTRACT

The object of the invention is to provide a storage device represented by a removable hard disk from which a cartridge having a storage medium is removable, to which cartridges having different specification sizes of the outer shapes can be applied. A cartridge of this invention is detachably loaded in a holder portion for a storage device outside a computer or a storage device incorporated in a computer, and has a storage medium. The cartridge includes a groove which engages with a locking portion provided to the holder portion to releasably lock the cartridge. The groove is formed at a predetermined distance in an inserting/removing direction from an end of the cartridge. This distance is set common for another cartridge which is detachably loaded in the holder portion and has a length different from that of the cartridge in the inserting/removing direction.

18 Claims, 15 Drawing Sheets

STORAGE DEVICE, CARTRIDGE, AND CARTRIDGE MANUFACTURING METHOD

TECHNICAL FIELD

The present invention relates to a storage device or the like represented by a removable hard disk from which a cartridge is removable.

BACKGROUND ART

As the size of electronic components decreases and their performance increases, compact notebook type personal computers for portability have become popular. Hence, many users use desktop type personal computers and notebook type personal computers at offices while they own a plurality of personal computers at home. As digital cameras and digital video cameras become popular, image data obtained by these cameras are managed by personal computers as the daily routine. Such image data has a large data volume, and the capacity of the hard disk or the like of a personal computer which stores the image data often becomes immediately insufficient.

In accordance with this situation, needs have arisen to be able to replace the hard disk of one personal computer easily so that it can be utilized in another personal computer. In particular, the capacity of the hard disk greatly increases year by year, and it is highly required to able to replace an old, small-capacity hard disk with a large-capacity hard disk. In order to cope with these requirements, a detachable hard disk (removable hard disk) that can be carried around easily and replaced easily has been proposed (for example, Japanese Patent Laid-Open Nos. 5-166102 and 2002-352546).

Progress and development in hard disks are remarkable, and the hard disks have been downsized and made to have lower profiles and higher performance. The specification sizes of the outer shapes of objects having the same storage capacity are becoming small day after day. Users particularly tend to prefer a compact removable hard disk because it is excellent in portability.

When downsizing of the removable hard disk progresses, however, the specification size of the outer shape of a new removable hard disk become largely different from that of an old one. Sometimes a cartridge having a storage medium cannot be physically mounted in and removed from a storage device main body which is provided outside or incorporated in a personal computer and designed in accordance with the old specification size of the outer shape. In this case, an adapter may be mounted to cope with different specification sizes of the outer shapes. This, however, makes the operation cumbersome. Moreover, when making electrical connection, the reliability may be degraded because the number of times the connection is made through the connector increases.

DISCLOSURE OF INVENTION

It is an object of the present invention to provide a storage device from which a cartridge having a storage medium is removable, to which cartridges having different specification sizes of the outer shapes can be applied.

According to the present invention, there is provided a storage device comprising a cartridge having a storage medium and a holder portion in which the cartridge is detachably loaded, the holder portion being capable of being loaded with a plurality of types of cartridges having different lengths in an inserting/removing direction, wherein
the holder portion includes:
a locking portion which is disposed at a first distance in the inserting/removing direction of the cartridge from an insertion port of the cartridge, and releasably locks the cartridge, and
a positioning member which is provided to be movable in the inserting/removing direction of the cartridge, and determines a leading end position in an inserting direction of the cartridge, and
the cartridge includes
an engaging portion which is disposed at a second distance in the inserting/removing direction of the cartridge from a trailing end in the inserting direction of the cartridge, and engages with the locking portion,
the second distance being common among the plurality of types of cartridges.

According to the present invention, there is also provided a storage device comprising a cartridge having a storage medium and a holder portion in which the cartridge is detachably loaded, the holder portion being capable of being loaded with a plurality of types of cartridges having different lengths in an inserting/removing direction, wherein
the holder portion includes
a positioning member which determines a leading end position in an inserting direction of the cartridge, and
a locking portion which is disposed at a first distance in the inserting/removing direction of the cartridge from the positioning member, and releasably locks the cartridge, and
the cartridge includes
an engaging portion which is disposed at a second distance in the inserting/removing direction of the cartridge from a leading end in the inserting direction of the cartridge, and engages with the locking portion,
the second distance being common among the plurality of types of cartridges.

According to the present invention, there is also provided a cartridge which is detachably loaded in a holder portion in a storage device outside a computer or a storage device incorporated in a computer and has a storage medium, comprising
an engaging portion which engages with a locking portion provided to the holder portion to releasably lock the cartridge, and is arranged at a predetermined distance in an inserting/removing direction from an end of the cartridge,
the predetermined distance being set common for another cartridge which is detachably loaded in the holder portion and has a length different from that of the cartridge in the inserting/removing direction.

According to the present invention, there is also provided a cartridge manufacturing method of manufacturing a plurality of cartridges which are detachably loaded in a holder portion for a storage device outside a computer or a storage device incorporated in a computer and have a storage media, the cartridges having different lengths in an inserting/removing direction, comprising
providing an engaging portion at a predetermined distance in the inserting/removing direction from an end of the cartridge, the engaging portion engaging with a locking portion provided to the holder portion to releasably lock the cartridge, and
setting the predetermined distance common among the plurality of types of cartridges.

According to the present invention, there is also provided a storage device comprising a holder portion in which a cartridge having a storage medium is detachably loaded, the holder portion being capable of being loaded with a plurality of types of cartridges having different lengths in an inserting/removing direction, the cartridges including engaging portions disposed at a predetermined distance in the inserting/ removing direction from a trailing end in an inserting direction of the cartridge, wherein the holder portion includes a locking portion which is disposed at a predetermined distance in the inserting/removing direction of the cartridge from an insertion port of the cartridge, and engages with the engaging portion to releasably lock the cartridge, and a positioning member which is provided to be movable in the inserting/removing direction of the cartridge, and determines a leading end position in an inserting direction of the cartridge.

According to the present invention, there is also provided a storage device comprising a holder portion in which a cartridge having a storage medium is detachably loaded, the holder portion being capable of being loaded with a plurality of types of cartridges having different lengths in an inserting/removing direction, the cartridges including engaging portions disposed at a predetermined distance in the inserting/removing direction from a leading end in the inserting/removing direction of the cartridge, wherein the holder portion includes a positioning member which determines a leading end position in an inserting direction of the cartridge, and a locking portion which is disposed at a predetermined distance in the inserting/removing direction of the cartridge from the positioning member, and engages with the engaging portion to releasably lock the cartridge.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

BEST MODE FOR CARRYING OUT THE INVENTION

A preferred embodiment of the present invention will be described below with reference to the accompanying drawings.

In this specification, roughly, the preferred embodiments of the present invention will be described through two typical examples. In each of these embodiments, a plurality of types of cartridges can be applied, but the structures of the storage devices are different between the first and second embodiments. More specifically, one cartridge can be applied to different storage devices.

FIRST EMBODIMENT

Figure 1:
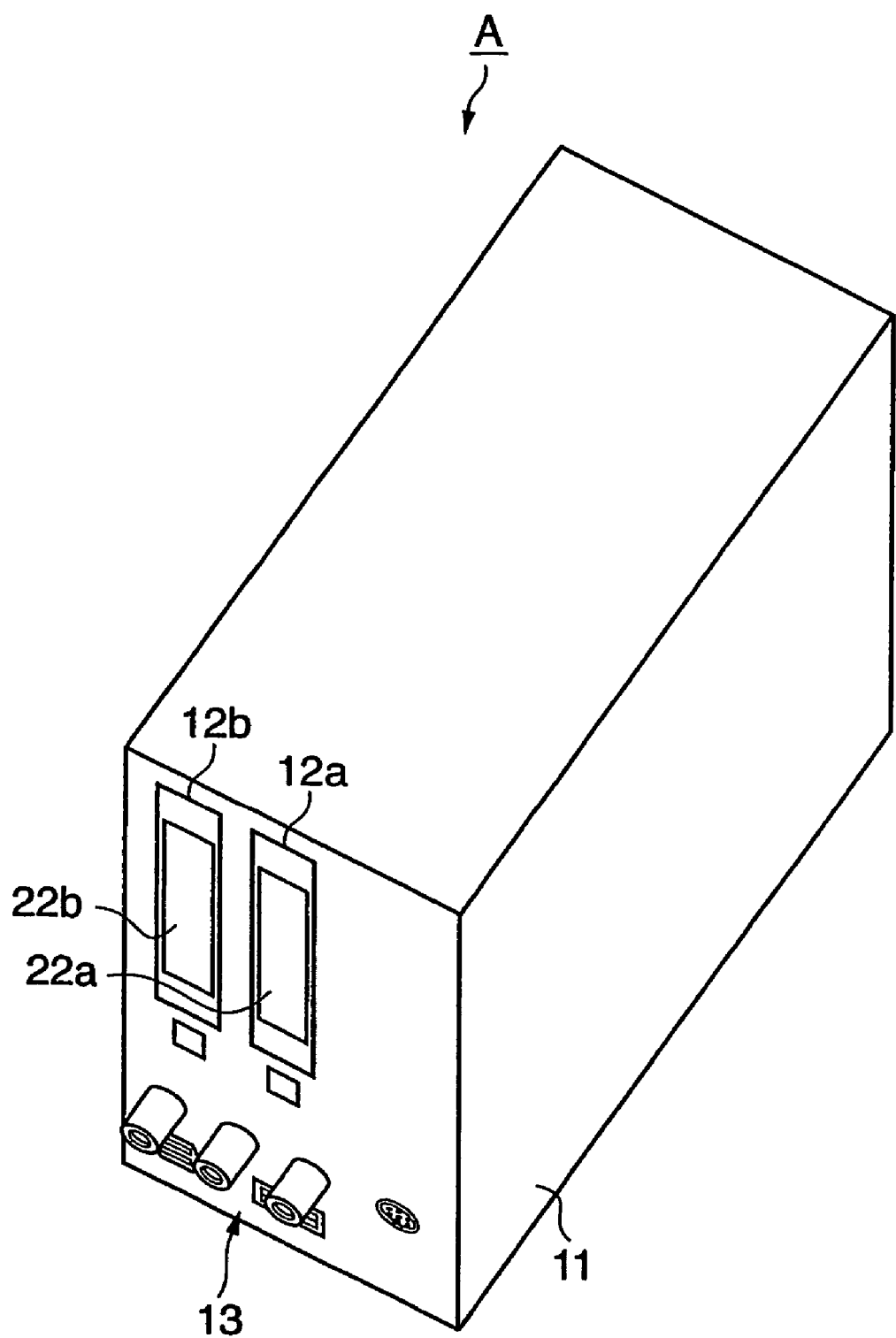
FIG. 1 is a perspective view of the outer appearance of a storage device A according to the first embodiment of the present invention.
Figure 2:
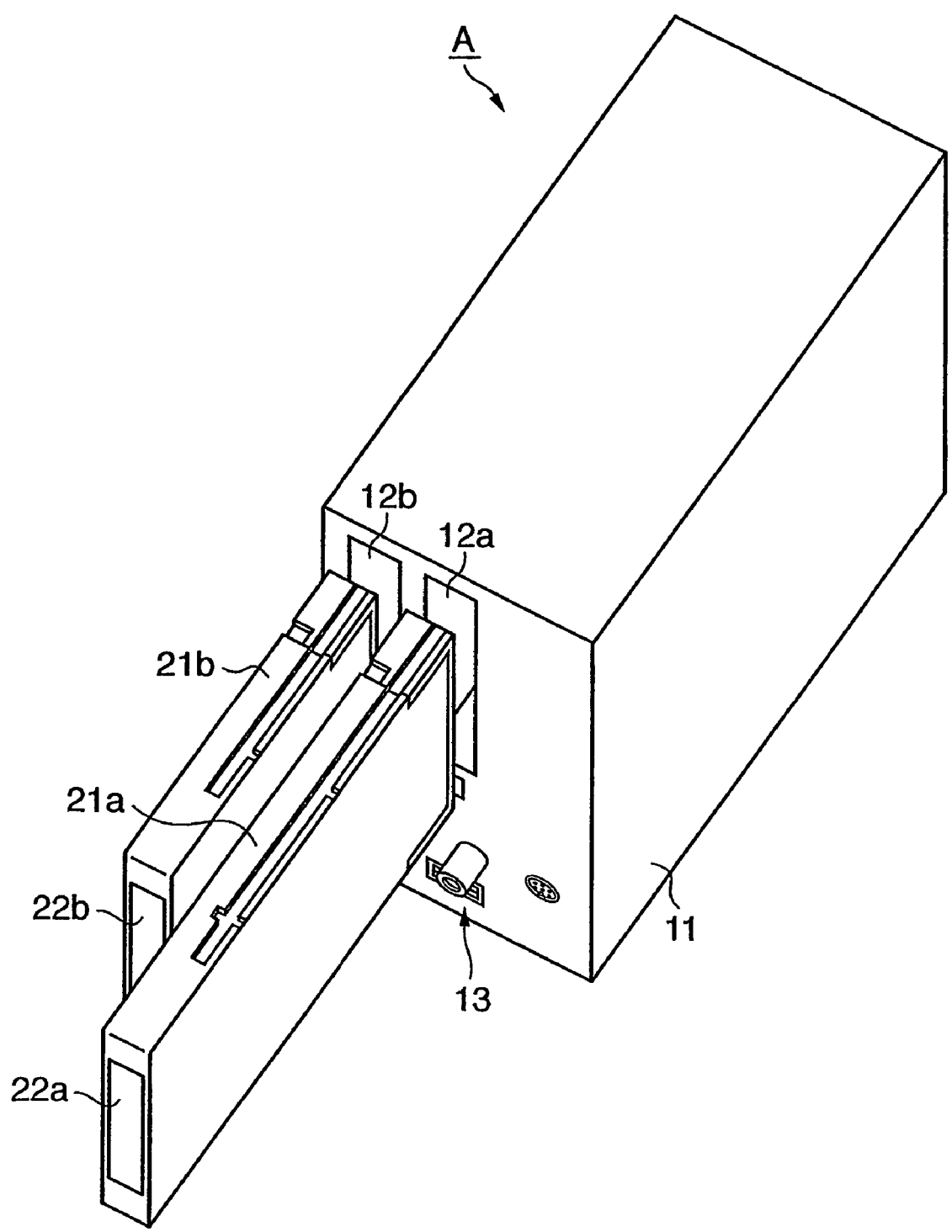
FIG. 2 is a perspective view of the outer appearance of the storage device A according to the first embodiment of the present invention.

FIGS. 1 and 2 are views of the outer appearance of a storage device A according to one embodiment of the present invention, in which FIG. 1 shows a state wherein removable hard disk cartridges 21a and 21b are loaded, and FIG. 2 shows a state wherein the cartridges 21a and 21b are removed. In this embodiment, the present invention is applied to a removable hard disk, but the present invention can naturally be applied to devices having other storing schemes.

The storage device A includes a substantially rectangular parallelepiped device main body 11. The device main body 11 forms a holder portion in which the cartridges 21a and 21b are detachably loaded through openings 12a and 12b which are formed in the front surface of the device main body 11 to form insertion ports. Various types of connector jack portions 13 are formed on the front surface of the device main body 11 to transmit or receive electronic data accumulated in the cartridges 21a and 21b to or from other equipment. In this embodiment, the storage device A is formed as a storage device outside a computer such as a personal computer. The storage device A can also be formed as a storage device to be incorporated in a computer. In the latter case, a casing (case) or the like is not necessary, as a matter of course.

The cartridges 21a and 21b have both substantially rectangular parallelepiped outer shapes. The specifications sizes of the outer shapes of the cartridges 21a and 21b are substantially the same except for their lengths in the inserting/removing direction with respect to the device main body 11. More specifically, the length in the inserting/removing direction of the cartridge 21a is larger than the length in the inserting/removing direction of the cartridge 21b. In this embodiment, the plurality of cartridges 21a and 21b having different lengths in the inserting/removing direction in this manner is removable from one device main body 11. Each of the cartridges 21a and 21b is removable from each one of the openings 12a and 12b. Identification labels are to be adhered to inserting-direction trailing end faces 22a and 22b of the cartridges 21a and 21b, respectively. As shown in FIG. 1, after the cartridges 21a and 21b are loaded in the device main body 11, the operator can visually confirm the labels through the openings 12a and 12b, so that the cartridges 21a and 21b can be discriminated from each other.

Figure 3:
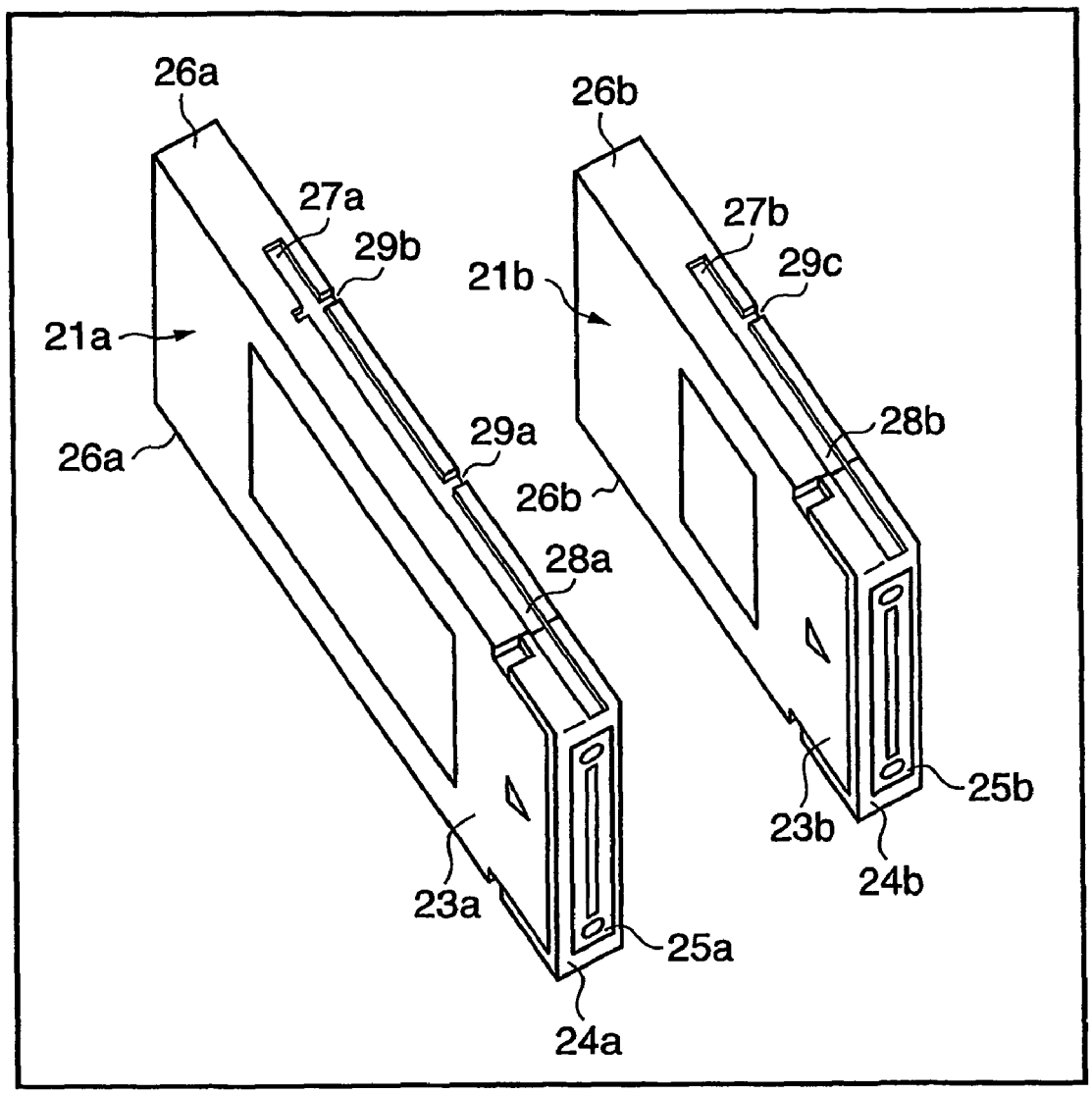
FIG. 3 is a perspective view of the outer appearances of cartridges 21a and 21b.

The structures of the cartridges 21a and 21b will be described with reference to FIG. 3. FIG. 3 is a perspective view of the outer appearances of the cartridges 21a and 21b. Referring to FIG. 3, the cartridges 21a and 21b have substantially rectangular parallelepiped cases 23a and 23b, respectively, and connector portions 24a and 24b, respectively. The cases 23a and 23b incorporate hard disks as storage media, electrical circuits such as flexible printed boards, cushioning members for absorbing shock, and the like in the same manner as a general removable hard disk.

The connector portions 24a and 24b are identical, and are arranged at the leading end portions in the inserting/removing direction of the cartridges 21a and 21b, to form connecting portions to electrically connect the device main body 11 to the cartridges 21a and 21b. The connector portions 24a and 24b are respectively provided with shutters 25a and 25b to protect them. When the cartridges 21a and 21b are extracted from the device main body 11, the shutters 25a and 25b are closed. When the cartridges 21a and 21b are to be mounted in the device main body 11, receptacle-side connectors (to be described later) as the electrical connecting portions of the device main body 11 open the shutters 25a and 25b. The connector connecting portions are then brought into contact with each other so that they are electrically connected to each other. Thus, electronic data can be transmitted and received.

Figure 4:
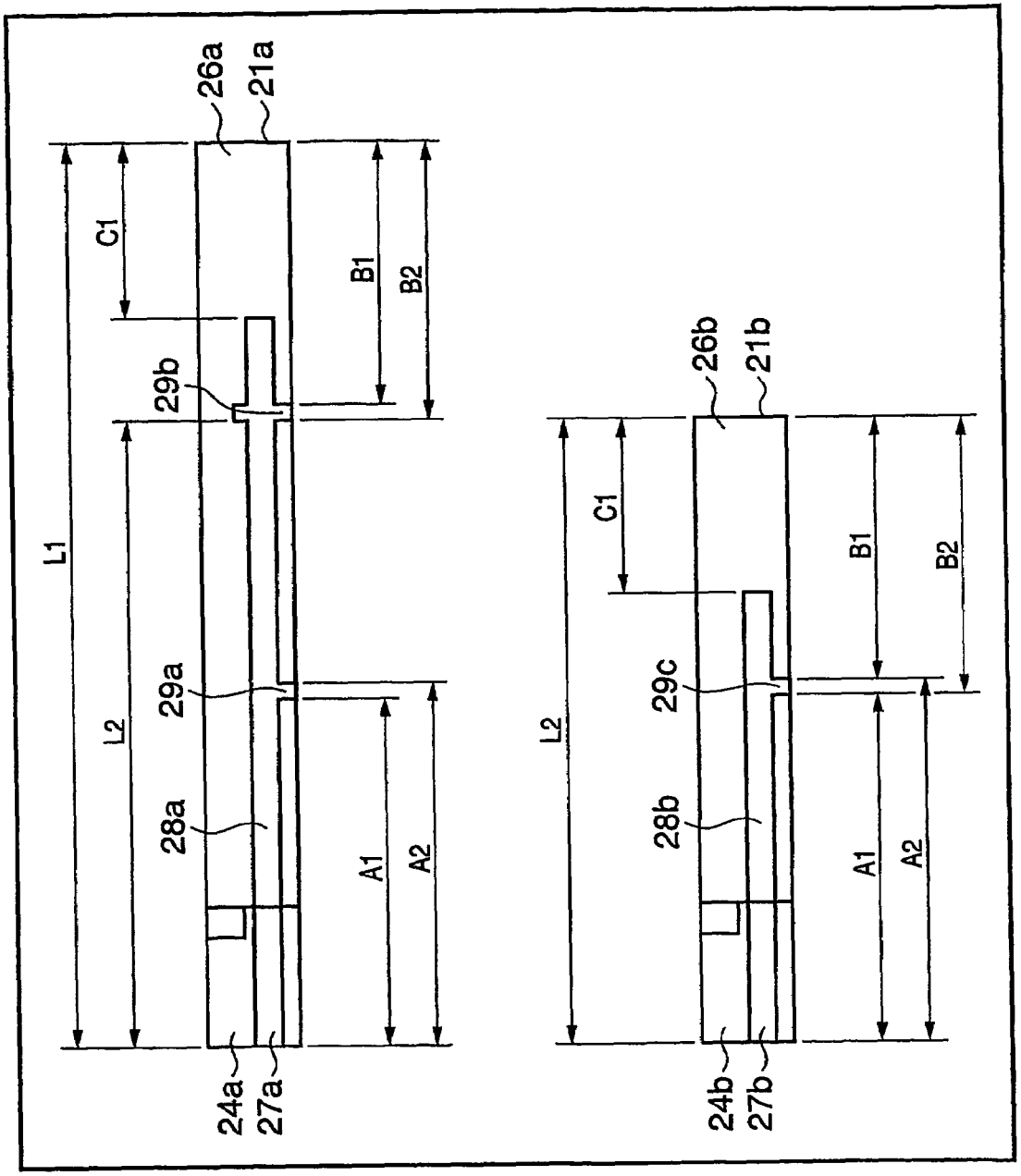
FIG. 4 is a view showing guide surfaces 26a and 26b, and particularly explains the relationship between the sizes of first and second grooves 27a and 27b.

The two, upper and lower side surfaces of the cartridge 21a and those of the cartridge 21b respectively form guide surfaces 26a and 26b which guide insertion of the cartridges 21a and 21b into the device main body 11. A first groove 27a linked to the connector portion 24a is formed in one guide surface 26a. Similarly, a second groove 27b linked to the connector portion 24b is formed in one guide surface 26b. Although not shown, a groove symmetrical to the first groove 27a and a groove symmetrical to the second 27b are formed in the guide surfaces 26a and 26b, respectively, on the other side. The arrangement of these grooves will be described in detail with reference to FIG. 4. FIG. 4 is a view showing the guide surfaces 26a and 26b, and particularly explains the relationship between the sizes of the first and second grooves 27a and 27b.

As described above, the length in the inserting/removing direction of the cartridge 21a is larger than that of the cartridge 21b. Except for this, the specification size of the outer shape of the cartridge 21a is substantially equal to that of the cartridge 21b. In the cartridge 21a, the first groove 27a is formed in the guide surface 26a, and includes a combination of recesses parallel and perpendicular to the inserting/removing direction. A first horizontal groove 28a is part of the first groove 27a, and forms a guide groove which extends in the inserting/removing direction of the cartridge 21a in order to guide the cartridge 21a so as to be inserted in the device main body 11 appropriately. A first vertical groove 29a is similarly part of the first groove 27a, and is formed perpendicularly to intersect the first horizontal groove 28a. The first vertical groove 29a mainly serves as an engaging portion which engages with a locking portion formed on the device main body of a storage device according to the second embodiment (to be described later).

A second vertical groove 29b is similarly part of the first groove 27a, and is formed perpendicularly to intersect the first horizontal groove 28a. The second vertical groove 29b serves as an engaging portion which engages with a locking portion (to be described later) formed on the device main body 11. The second vertical groove 29b is disposed at a constant distance from the inserting-direction trailing end of the cartridge 21a, that is, in this embodiment, from the trailing end face 22a in the inserting/removing direction.

Similarly, in the cartridge 21b, the second groove 27b is formed in the guide surface 26b, and includes a combination of recesses parallel and perpendicular to the inserting/removing direction. A second horizontal groove 28b forms a guide groove which extends in the inserting/removing direction of the cartridge 21b in order to guide the cartridge 21b so as to be inserted in the device main body 11 appropriately. A third vertical groove 29c is similarly part of the second groove 27b, and is formed perpendicularly to intersect the second horizontal groove 28b. The third vertical groove 29c serves as an engaging portion which engages with a locking portion (to be described later) formed on the device main body 11. The third vertical groove 29c is disposed at a constant distance from the inserting-direction trailing end of the cartridge 21b, that is, in this embodiment, from the trailing end face 22b in the inserting/removing direction, and at a constant distance from the inserting-direction leading end in the inserting/removing direction. The third vertical groove 29c also serves as an engaging portion that engages with a locking portion formed on the device main body in the storage device of the second embodiment (to be described later). The third vertical groove 29c of the cartridge 21b has the same arrangement as that of the first vertical groove 29a of the cartridge 21a.

The relationship in size between the first and second grooves 27a and 27b will be described. As shown in FIG. 4, assume that the entire lengths of the cartridges 21a and 21b are defined as sizes L1 and L2, respectively. Assume that the front and rear sides in the widthwise direction of the first vertical groove 29a are defined as sizes A1 and A2, respectively, from the leading end portion side (connector portion 24a side) in the inserting/removing direction of the cartridge 21a. Also, assume that the front and rear sides in the widthwise direction of the second vertical groove 29b are defined as sizes B2 and B1, respectively, from the trailing end side (trailing end face 22a side) in the inserting direction of the cartridge 21a. Also, assume that the front side in the widthwise direction of the second vertical groove 29b is defined as a size L2 (the entire length of the cartridge 21b) from the front-surface connector portion 24a side.

Assume that the front and rear sides in the widthwise direction of the third vertical groove 29c are defined as sizes A1 and A2, respectively, from the leading end portion side in the inserting direction of the cartridge 21b. Also, assume that the front and rear sides in the widthwise direction of the third vertical groove 29c are defined as sizes B2 and B1, respectively, from the trailing end portion side in the inserting direction of the cartridge 21b. Namely, the second vertical groove 29b of the cartridge 21a and the third vertical groove 29c of the cartridge 21b have the same size when measured from the trailing end portion in the inserting direction. Furthermore, the first vertical groove 29a of the cartridge 21a and the third vertical groove 29c of the cartridge 21b have the same size when measured from the leading end portion in the inserting direction.

The second vertical groove 29b of the cartridge 21a extends upwardly from the first horizontal groove 28a, and the shape of the second vertical groove 29b of the cartridge 21b and that of the third vertical groove 29c of the cartridge 21b are different. Namely, the second vertical groove 29b of the cartridge 21a has a crisscross shape, while the third vertical groove 29c of the cartridge 21b has a T-shape. Thus, the cartridges 21a and 21b can be discriminated from each other.

The relationship in size will be described. Assume that the size from the trailing end portion side in the inserting direction of the cartridge 21a to the trailing end side of the first horizontal groove 28a is defined as C1, and similarly, the size of the trailing end portion side in the inserting direction of the cartridge 21b to the trailing end side of the second horizontal groove 28b is defined as C1. When the cartridge 21a is to be inserted in the device main body 11, the trailing end sides of the first horizontal grooves 28a interfere with engaging projections 43a and 43b (to be described later) formed in the device main body 11. Even when the cartridge 21a is to be forced into the device main body 11, the position of the cartridge 21a is regulated such that the trailing end face 22a will not be inserted deep exceeding the opening 12a or 12b of the device main body 11. Similarly, when the cartridge 21b is to be inserted in the device main body 11, the trailing end face 22b will not be inserted deep exceeding the opening 12a or 12b of the device main body 11.

Countermeasures for preventing erroneous insertion of the cartridges 21a and 21b into the device main body 11 will be described briefly. First, in the cartridge 21a, no groove portion is formed after the trailing end side of the first horizontal groove 28a. Even when the cartridge 21a is to be inserted in the device main body 11 from the trailing end face 22a side, the cartridge 21a interferes with the engaging projections 43a and 43b (to be described later) of the device main body 11. The first horizontal groove 28a is not formed at the central position in the direction of thickness of the cartridge 21a. Even when the cartridge 21a is to be inserted in the device main body 11 upside down in the direction of thickness, it interferes with the engaging projections 43a and 43b (to be described later). Even when the cartridge 21a is to be inserted in the device main body 11 from a surface other than a surface in the inserting direction, the area of such surface is larger than the open area of the opening 12a or 12b, so the cartridge 21a cannot be inserted. The same effect can be obtained with the countermeasures for preventing erroneous insertion when the cartridge 21b is to be inserted in the device main body 11.

Figure 5:
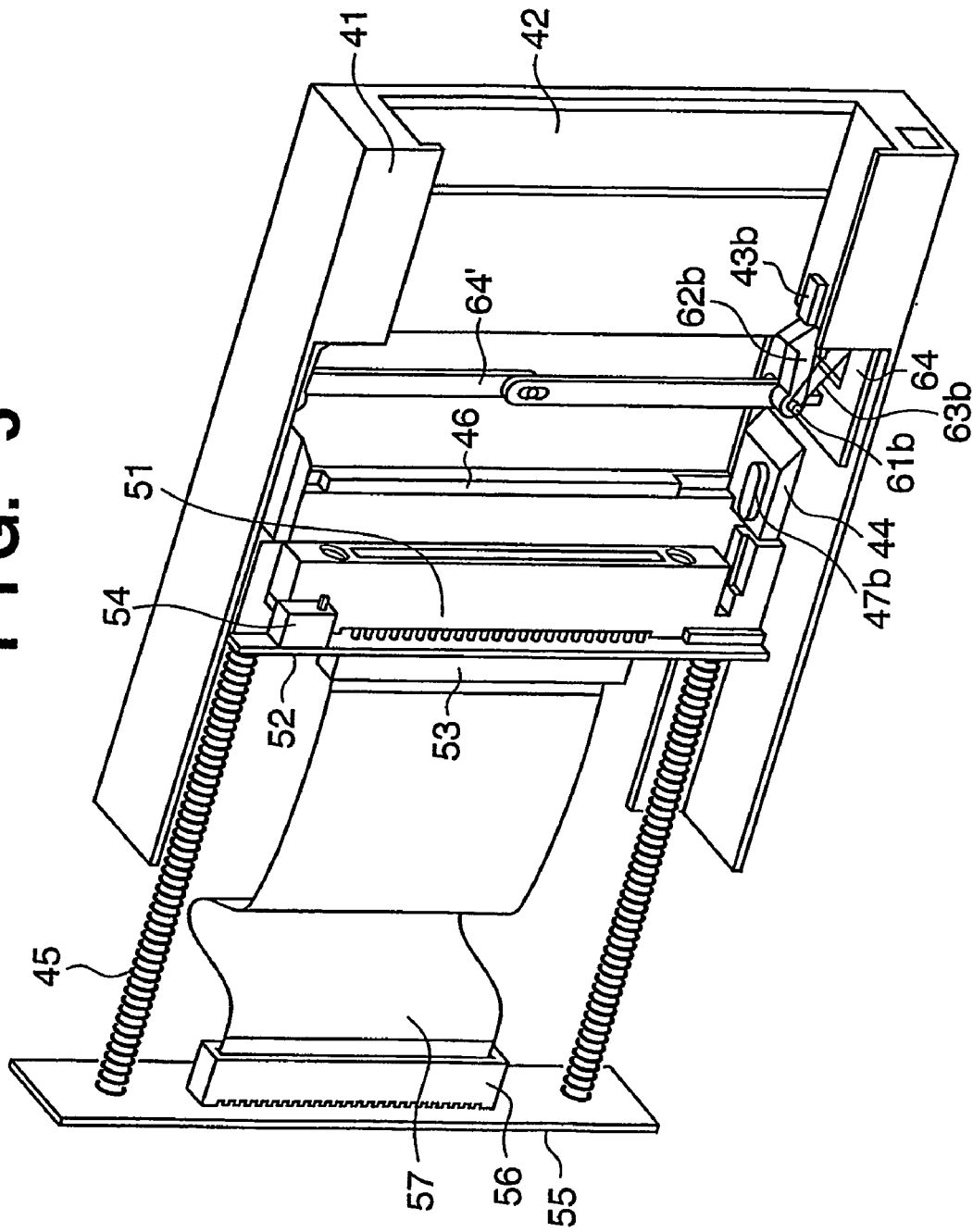
FIG. 5 is a view showing the internal structure of a device main body 11.
Figure 6:
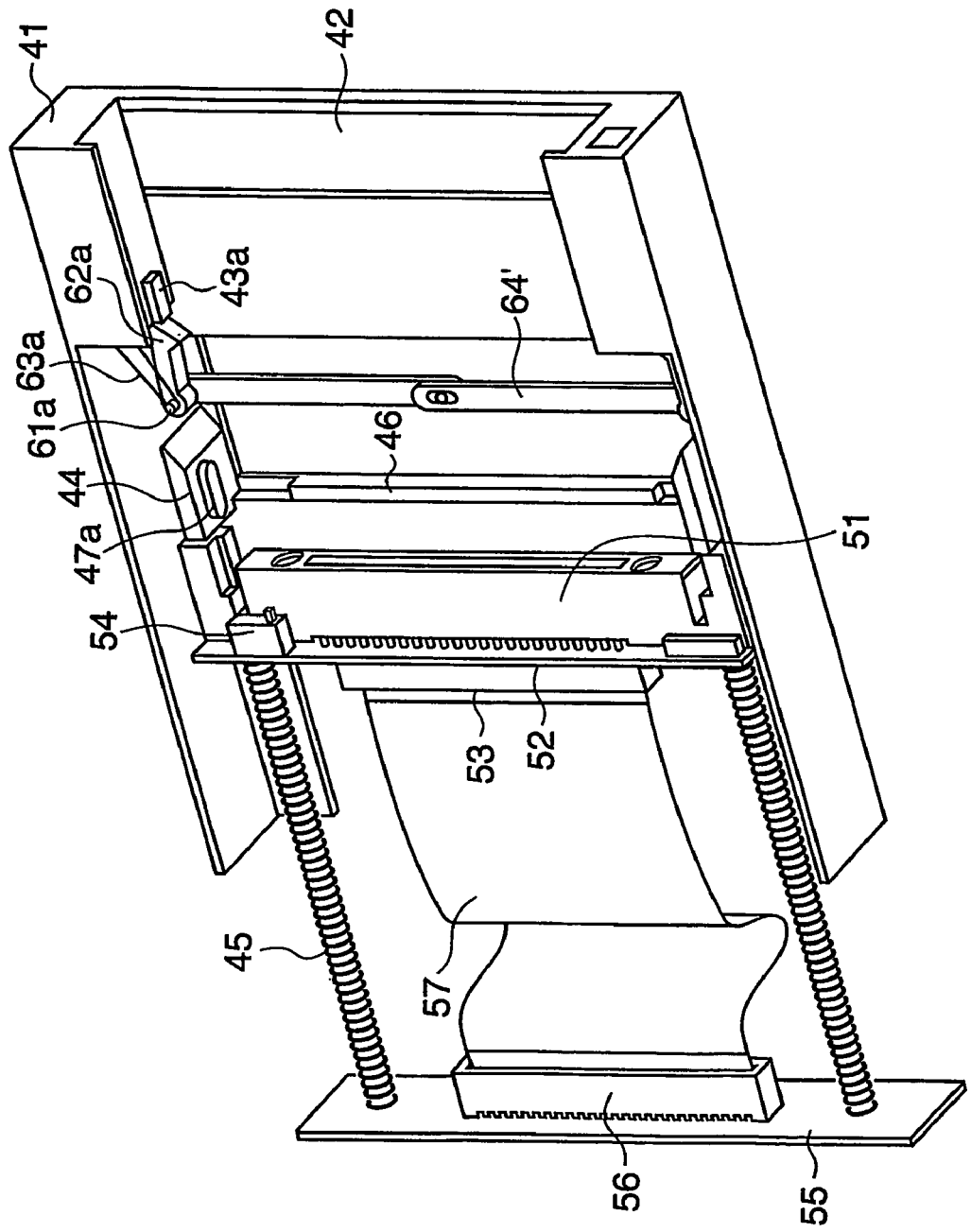
FIG. 6 is a view showing the internal structure of the device main body 11.

The internal structure of the device main body 11 will be described. The interior of the device main body 11 has a function of holding the cartridges 21a and 21b, as will be described hereinafter. FIGS. 5 and 6 are views of the internal structure of the device main body 11, to show a holder portion which stores either the cartridge 21a or 21b. Two sets of such a holder portion are provided in the device main body 11. A socket frame 41 forms the frame of the holder portion in the device main body 11. An opening 42 forms the open end of the storing space for the cartridge 21a or 21b, and forms the opening 12a or 12b of the device main body 11.

The engaging projections 43a and 43b engage with the first grooves 27a of the cartridge 21a or the second grooves 27b of the cartridge 21b, and serve as guide pieces that guide the cartridge 21a or 21b when it is to be inserted. The engaging projections 43a and 43b are formed to project from the upper and lower inner surfaces of the socket frame 41. The engaging projections 43a and 43b also serve to prevent erroneous insertion of the cartridge 21a or 21b into the socket frame 41, as described above.

Pallets 44 are formed to be movable in the socket frame 41 in the inserting/removing direction of the cartridge 21a or 21b, and serve as positioning members that determine the position of the leading end in the inserting direction of the cartridge 21a or 21b. The pallets 44 are constantly biased by compression springs 45 toward the opening 42. Although compression springs are used in this embodiment, other elastic members may be employed. An abutting portion 46 is a member which is fixed to the socket frame 41 and regulates movement of the pallets 44 toward the opening 42 up to a predetermined position. The pallets 44 are biased by the compression springs 45 and move toward the opening 42. The movement of the pallets 44 is regulated as they abut against the abutting portion 46.

Engaging projections 47a and 47b serve as guide pieces which engage with the first grooves 27a of the cartridge 21a or the second grooves 27b of the cartridge 21b and guide the cartridge 21a or 21b onto the pallets 44. The engaging projections 47a and 47b project from the upper and lower inner surfaces of the pallets 44.

A receptacle-side connector 51 is fixed on the pallets 44 and forms a connecting portion to be electrically connected to the electrical contact terminal of the connector portion 24a or 24b of the cartridge 21a or 21b. As the cartridge 21a or 21b is being inserted, the receptacle-side connector 51 is pushed by the leading end portion in the inserting direction of the cartridge 21a or 21b, and moves together with the pallets 44. Thus, the receptacle-side connector 51 forms part of a positioning member that determines the position of the leading end in the inserting direction of the cartridge 21a or 21b.

A receptacle-side PCB 52 is soldered to the receptacle-side connector 51, and a flexible cable connector 53 is soldered to the rear surface of the receptacle-side PCB 52. Furthermore, a switch 54 is soldered to the receptacle-side PCB 52, and serves to detect that the connector portion 24a or 24b of the cartridge 21a or 21b has been completely connected to the receptacle-side connector 51. The receptacle-side PCB 52, flexible cable connector 53, and switch 54 are electrically connected to each other.

A main-body-side PCB 55 is fixed to the case of the device main body 11, and a flexible cable connector 56 is soldered to the main-body-side PCB 55. A flexible cable 57 is connected to the two flexible cable connectors 53 and 56. Thus, the loaded cartridge 21a or 21b can transmit or receive accumulated electronic data to and from the CPU of an external computer or the like through the connector portion 24a or 24b, receptacle-side connector 51, flexible cable connector 53, flexible cable 57, and flexible cable connector 56.

Shafts 61a and 61b are arranged in the socket frame 41, and pivotally, axially support pawl members 62a and 62b, respectively. Torsion springs 63a and 63b are elastic members that are similarly mounted on the shafts 61a and 61b, respectively, to bias the pawl members 62a and 62b to close them inwardly with respect to the socket frame 41. Although torsion springs are used in this embodiment, other elastic members may be used.

The pawl members 62a and 62b are disposed at a constant distance (a distance with which the engaging position falls between the sizes B1 and B2 of FIG. 4) in the inserting/removing direction from the opening 42 that serves as the insertion port for the cartridge 21a or 21b. The pawl members 62a and 62b are also disposed at positions where they engage with the first vertical grooves 29a of the cartridge 21a or the third vertical grooves 29c of the cartridge 21b. The pawl members 62a and 62b serve as locking portions which releasably lock the cartridge 21a or 21b.

An eject lever 64 can move along the socket frame 41. One end of the eject lever 64 is substantially flush with the opening 42, and forms an operating portion for unloading the cartridge 21a or 21b loaded in the holder portion. The eject lever 64 engages with the pawl member 62b. When the operator pushes the operating portion of the eject lever 64, the eject lever 64 moves to pivot the pawl member 62b about the shaft 61b as the pivotal center such that the pawl member 62b opens outwardly with respect to the socket frame 41. The pawl members 62b and 62a are connected through a link mechanism 64'. The pawl member 62a similarly pivots about the shaft 61a as the pivotal center so that the pawl member 62a opens outwardly with respect to the socket frame 41. Consequently, the socket frame 41 is biased by the compression springs 45 to move toward the opening 42, and the loaded cartridge 21a or 21b is unloaded.

Figure 7:
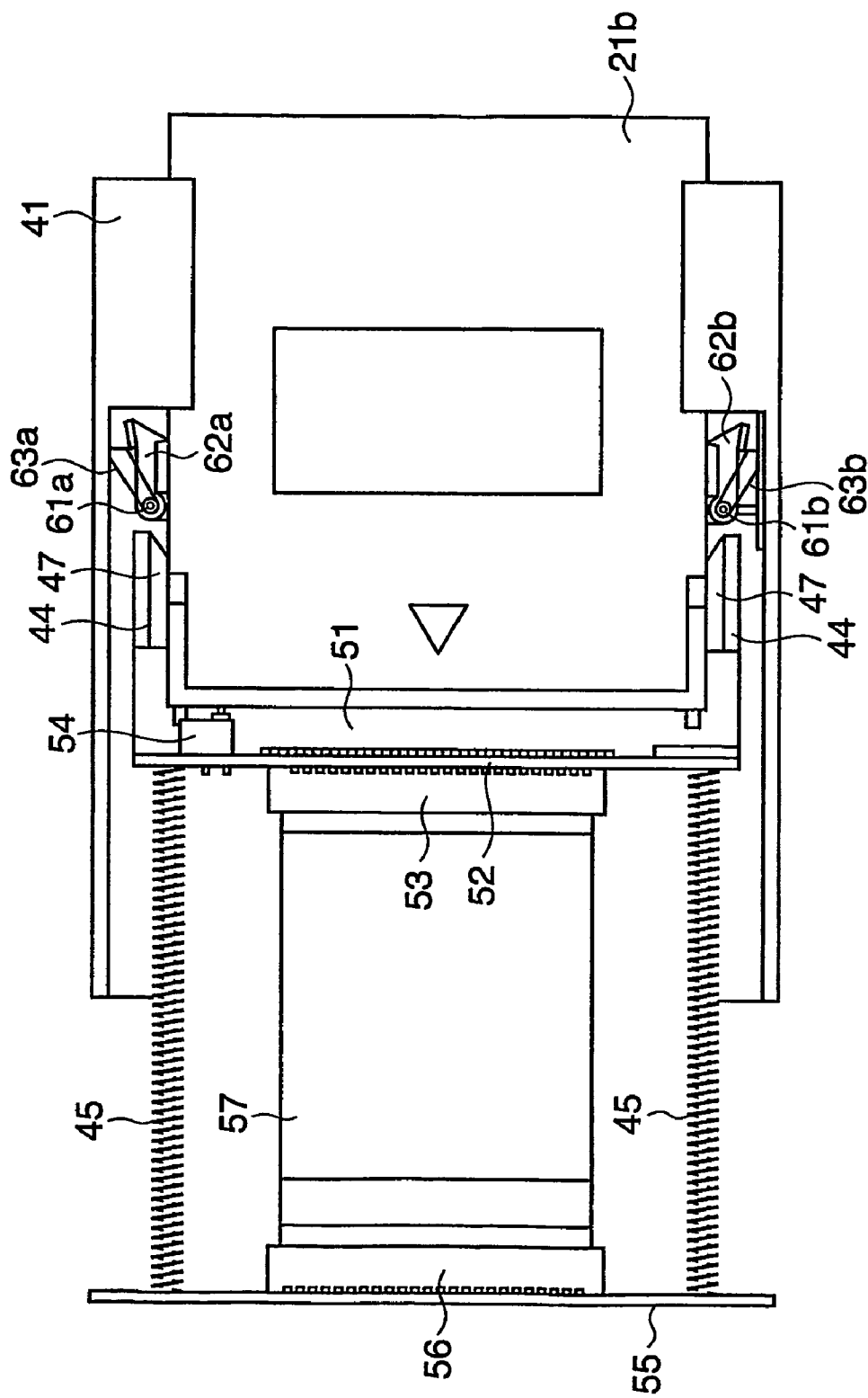
FIG. 7 is a view showing a state wherein the cartridge 21b is being inserted into a holder portion.

The operation that takes place when inserting the cartridge 21a or 21b into the holder portion having the above structure will be described. FIG. 7 is a view showing a state wherein the cartridge 21b is to be inserted into the holder portion. When the cartridge 21b is inserted into the socket frame 41, the engaging projections 43a and 43b, engaging projections 47a and 47b, and second grooves 27b guide the connector portion 24b to the receptacle-side connector 51 on the pallets 44 which wait as they have it abutted against the abutting portion 46. When the cartridge 21b is inserted, the connector portion 24b abuts against the receptacle-side connector 51. At this time, the force with which the compression springs 45 push the pallets 44 is set larger than the mounting force of the receptacle-side connector 51 and connector portion 24b. Thus, the pallets 44 start to move backward after the receptacle-side connector 51 and connector portion 24b are connected. At this time, the switch 54 can detect that the receptacle-side connector 51 and connector portion 24b are connected reliably.

After the connector portion 24b and receptacle-side connector 51 are connected, as the cartridge 21b is being inserted, the pallets 44 start to move backward. Since the pawl members 62a and 62b are open obliquely to the opening 42, they are pushed outwardly open with respect to the socket frame 41, and do not interfere with insertion of the cartridge 21b.

Figure 8:
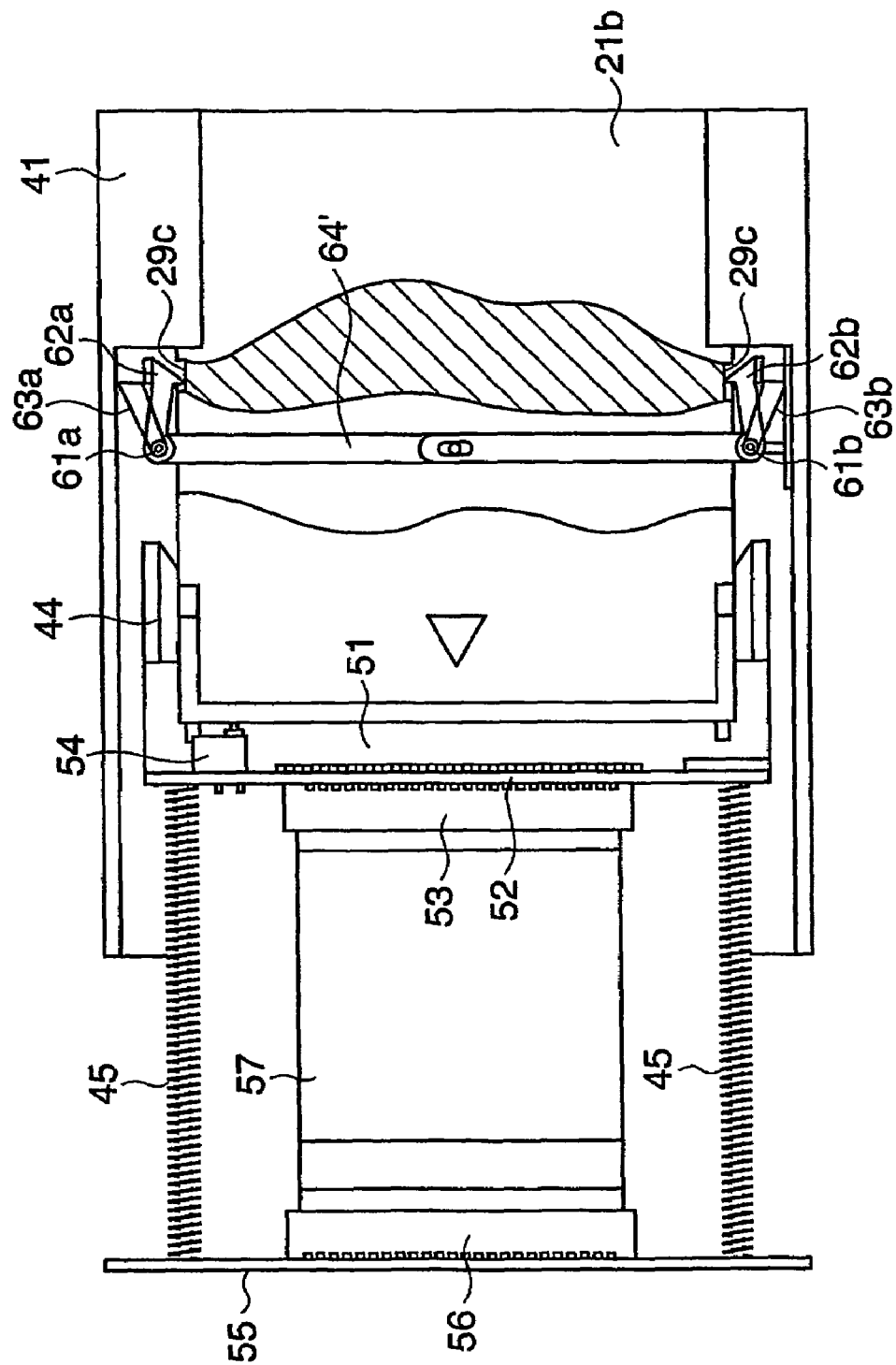
FIG. 8 is a view showing a state wherein the cartridge 21b is loaded in the holder portion.

FIG. 8 is a view showing a state wherein the cartridge 21b is loaded in the holder portion. FIG. 8 is a partially cutaway view in which part of the cartridge 21b is cut away to expose the pawl members 62a and 62b, so that the third vertical grooves 29c can be seen. When the cartridge 21b is inserted to a predetermined position in the socket frame 41, the compression springs 45 are compressed, and the pallets 44 move backward deep into the socket frame 41. At the same time, the trailing end face 22b of the cartridge 21b is aligned with the opening 42 (they become substantially flush). At this time, the distal ends of the pawl members 62a and 62b coincide with the third vertical grooves 29c. The torsion springs 63a and 63b bias the pawl members 62a and 62b to pivot, so that the distal ends of the pawl members 62a and 62b are fitted in the corresponding third vertical grooves 29c. Thus, the cartridge 21b is positioned and held in the socket frame 41.

Figure 9:
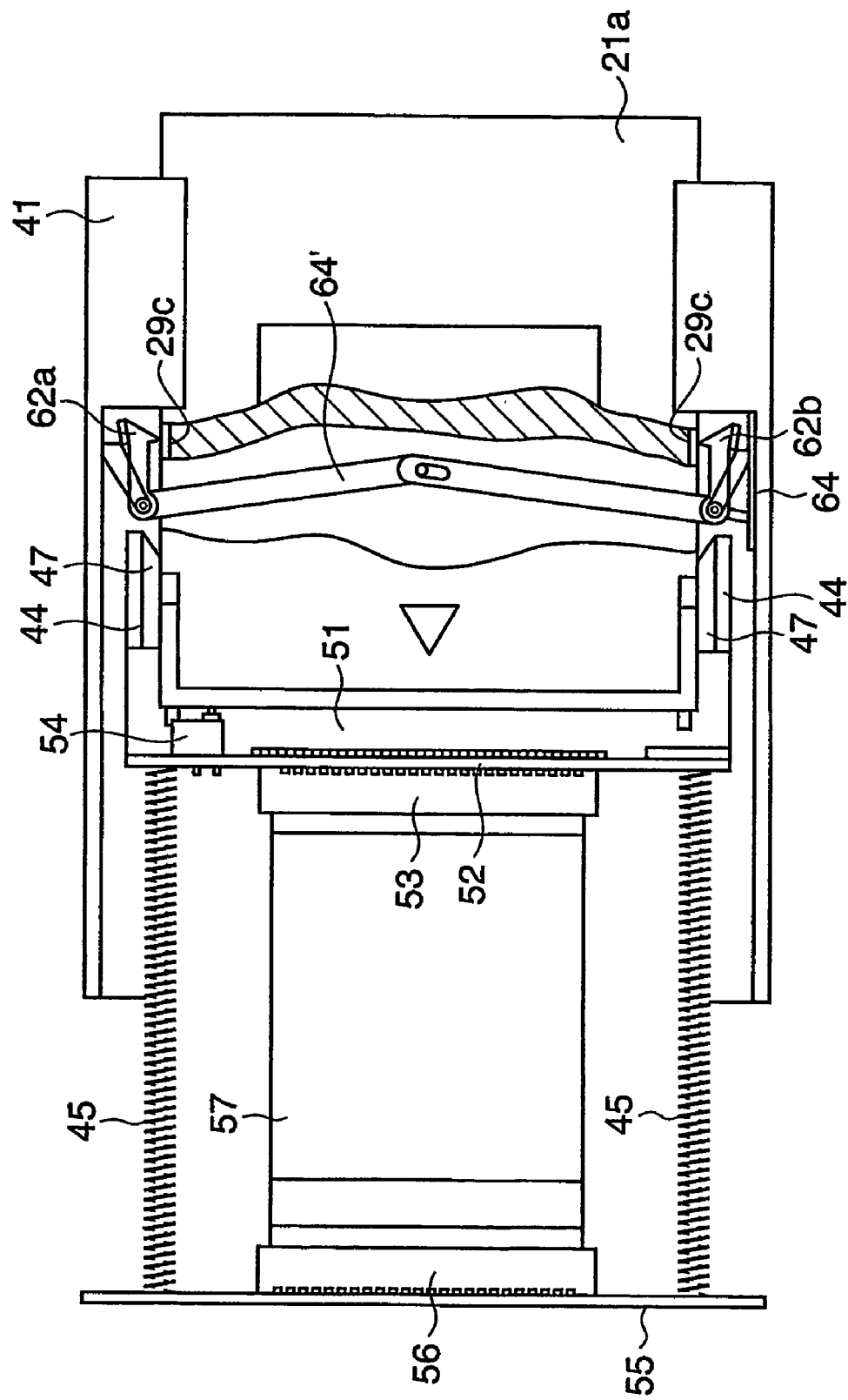
FIG. 9 is a view showing a state wherein the cartridge 21a is being unloaded from the holder portion.

FIG. 9 is a view showing a state wherein the cartridge 21b is to be unloaded from the holder portion. FIG. 9 is a partially cutaway view in which part of the cartridge 21b is cut away to expose the pawl members 62a and 62b. When the operator pushes the operating portion of the eject lever 64, the eject lever 64 moves, and the pawl member 62b engaging with the eject lever 64 and the pawl member 62a connected to the pawl member 62b through the link mechanism 64' open outwardly with respect to the socket frame 41. The distal ends of the pawl members 62a and 62b move backward from the corresponding third vertical grooves 29c, so the pawl members 62a and 62b disengage from the third vertical grooves 29c. The compression springs 45 push the pallets 44 backward until the abutting portion 46, so that the cartridge 21b is pushed out through the opening 42 from its trailing end portion. In this state, the operator can remove the cartridge 21b easily by holding its trailing end portion.

Figure 10:
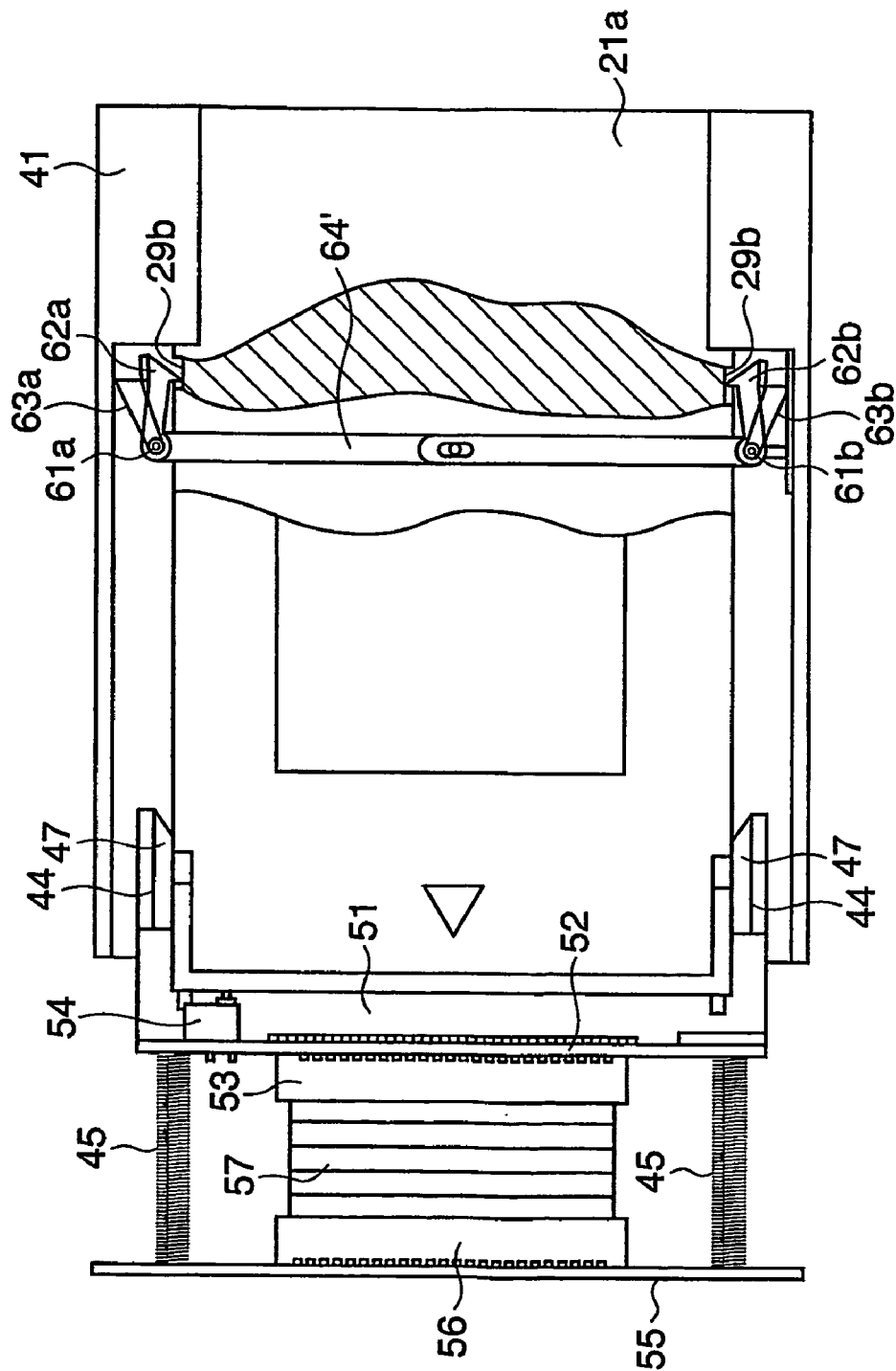
FIG. 10 is a view showing a state wherein the cartridge 21a is loaded in the holder portion.

A case will be described wherein the cartridge 21a is to be loaded in the holder portion. The operation that takes place when inserting the cartridge 21a into the holder portion will be omitted as it is the same as that for the cartridge 21b described with reference to FIG. 7. FIG. 10 is a view showing a state wherein the cartridge 21a is mounted in a storage medium holding device. FIG. 10 is a partially cutaway view in which part of the cartridge 21a is cut away to expose the pawl members 62a and 62b, so that the second vertical grooves 29b can be seen.

When the cartridge 21a is inserted to a predetermined position in the socket frame 41, in the same manner as that described with reference to FIG. 8, the compression springs 45 are compressed, and the pallets 44 move backward deep into the socket frame 41. At the same time, the trailing end face 22a of the cartridge 21a is aligned with the opening 42 (they become substantially flush). At this time, the distal ends of the pawl members 62a and 62b coincide with the second vertical grooves 29b. The torsion springs 63a and 63b bias the pawl members 62a and 62b to pivot, so that the distal ends of the pawl members 62a and 62b are fitted in the corresponding second vertical grooves 29b. Thus, the cartridge 21a is positioned and held in the socket frame 41.

This operation is different from that of the cartridge 21b in that the cartridge 21a is inserted much deeper as it is longer than the cartridge 21b in the inserting/removing direction, and that the compression amount of the compression springs 45 and the retreat amount of the pallets 44 are larger.

Namely, in this embodiment, when either cartridge 21a or 21b is loaded, its trailing end face 22a or 22b becomes substantially flush to provide a good and natural appearance. This is due to the following reason. Namely, the second vertical grooves 29b of the cartridge 21a and the third vertical grooves 29c of the cartridge 21b are disposed at a common distance in the inserting/removing direction from the trailing end portions (trailing end faces 22a and 22b) of the cartridges 21a and 21b. Furthermore, in this embodiment, the trailing end face 22a or 22b is substantially flush with the opening 42 as well, thus providing a better and natural appearance. This is due to the following reason. Namely, the second vertical grooves 29b of the cartridge 21a and the third vertical grooves 29c of the cartridge 21b are disposed for a common distance in the inserting/removing direction from the trailing end portions (trailing end faces 22a and 22b) of the cartridges 21a and 21b. Also, the positions (more precisely, engaging positions) of the pawl members 62a and 62b are set at positions with substantially the same distance from the opening 42 in the inserting/removing direction.

Figure 11:
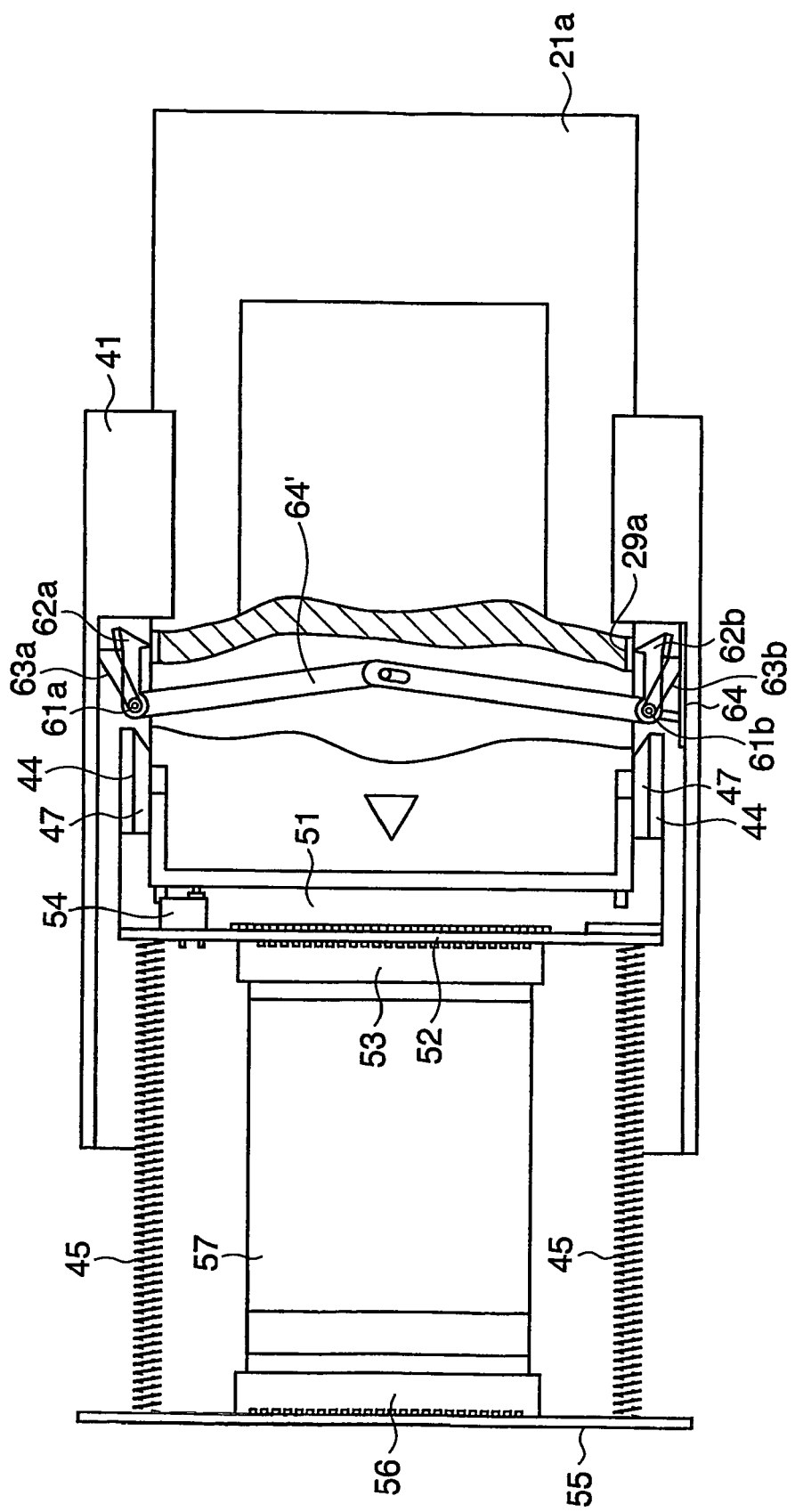
FIG. 11 is a view showing a state wherein the cartridge 21a is being unloaded from the holder portion.

FIG. 11 is a view showing a state wherein the cartridge 21a is to be unloaded from the holder portion. FIG. 11 is a partially cutaway view in which part of the cartridge 21a is cut away to expose the pawl members 62a and 62b. When the operator pushes the operating portion of the eject lever 64, in the same manner as that described with reference to FIG. 9, the eject lever 64 moves, and the pawl member 62b engaging with the eject lever 64 and the pawl member 62a connected to the pawl member 62b through the link mechanism 64' open outwardly with respect to the socket frame 41. The distal ends of the pawl members 62a and 62b move backward from the corresponding second vertical grooves 29b, so the pawl members 62a and 62b disengage from the third vertical grooves 29c. The compression springs 45 push the pallets 44 backward to the abutting portion 46, so that the cartridge 21a is pushed out through the opening 42 from its trailing end portion. In this state, the operator can hold the trailing end portion of the cartridge 21a and remove the cartridge 21a easily.

When the cartridge 21a is loaded, it may pop out because the compression springs 45 have a large compression amount. This problem can be coped with in the following manner. For example, as a solution, the eject lever 64 may be released temporarily at a position where the first vertical grooves 29a coincide with the pawl members 62a and 62b, so that they engage with each other temporarily. After this halt, the eject lever 64 is operated again to unload the cartridge 21a completely.

As described above, according to this embodiment, the cartridges 21a and 21b having different specification sizes of the outer shapes are compatible in a very simple manner while ensuring the reliability. Even when the cartridges 21a and 21b have different thicknesses, the same effect can be obtained as far as the relationship in arrangement of the guide grooves between them is maintained. In this manner, the cartridges 21a and 21b having different specification sizes of the outer shapes can be applied to the storage device A of this embodiment.

Furthermore, even if an improved removable hard disk having a small specification size of the outer shape must be utilized (e.g., replaced), it can be mounted in and removed from one storage device. For example, in a storage device incorporated in a personal computer having an auto-loading mechanism, a removable hard disk having a small specification size of the outer shape can be used without correcting the auto-loading mechanism portion. Furthermore, a removable hard disk having a small specification size of the outer shape can be used without mounting it in an exclusive conversion adapter. As the number of times connection is made through connector does not increase, the reliability is not degraded, and the operation does not become cumbersome. Therefore, the removable hard disk of this embodiment is compact and thus used particularly easily.

SECOND EMBODIMENT

The second embodiment is different from the first embodiment described above in only the structure of the holder portion, and the structures of cartridges 21a and 21b are the same as those of the first embodiment. More specifically, the cartridge 21a or 21b of this embodiment can be applied to a holder portion having a different structure in spite that it has the same structure as that of the first embodiment. The holder portion of this embodiment will be briefly described. In the first embodiment, when the cartridge 21a or 21b is to be loaded in the holder portion, its trailing end face 22a or 22b is set flush. In the second embodiment, the leading end face of the cartridge 21a or 21b is set flush. More specifically, in the second embodiment, movable pallets do not exist, unlike in the first embodiment. A receptacle-side connector which regulates the position of the leading end portion of the cartridge 21a or 21b is fixed to a socket frame 41. Hence, although the outer appearance of the holder portion of the second embodiment is inferior to that of the first embodiment, the holder portion of the second embodiment is similar to that of the first embodiment in that a plurality of types of cartridges 21a and 21b can be applied to it.

Figure 12:
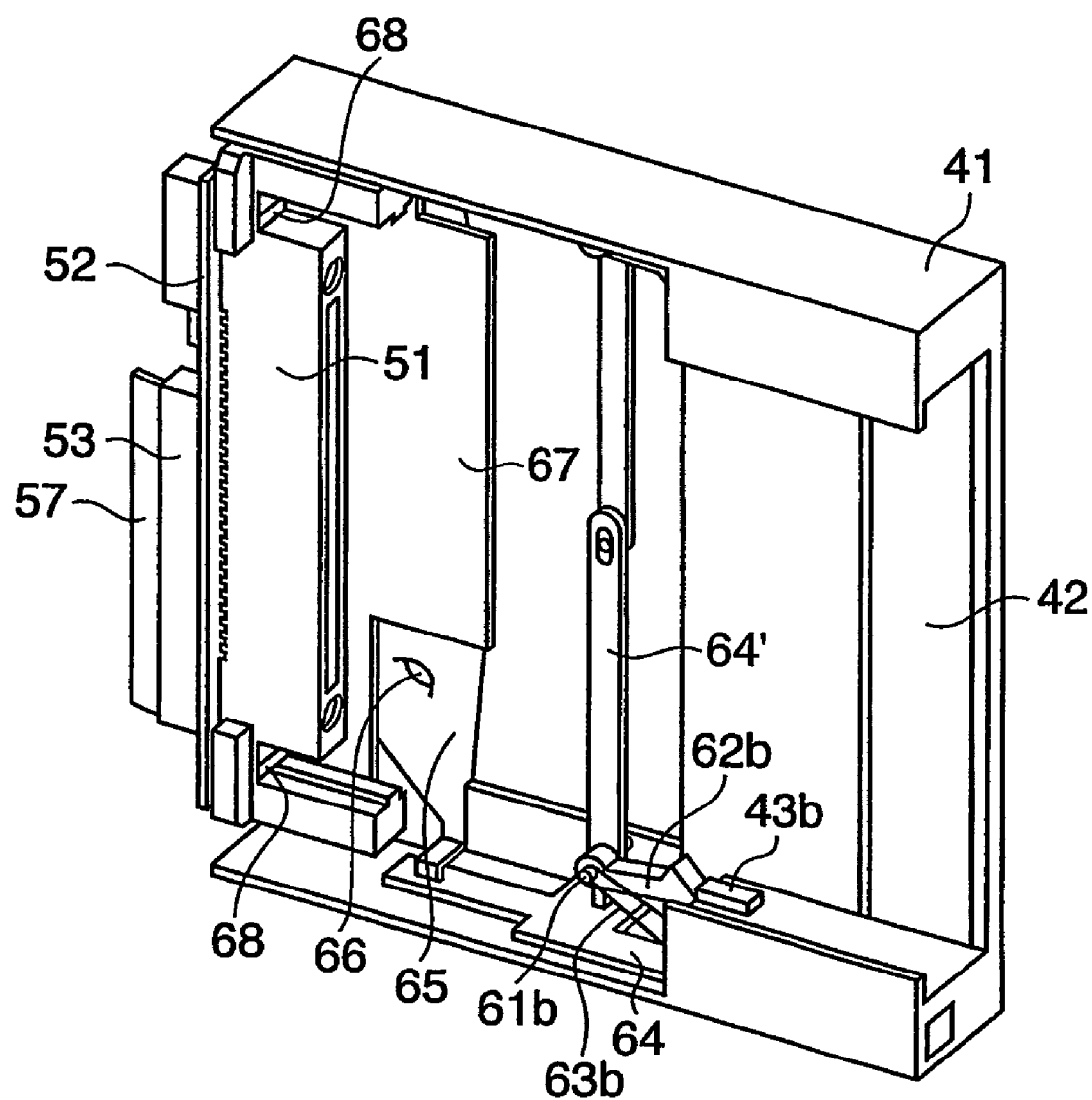
FIG. 12 is a view showing the structure of a holder portion according to the second embodiment of the present invention.
Figure 13:
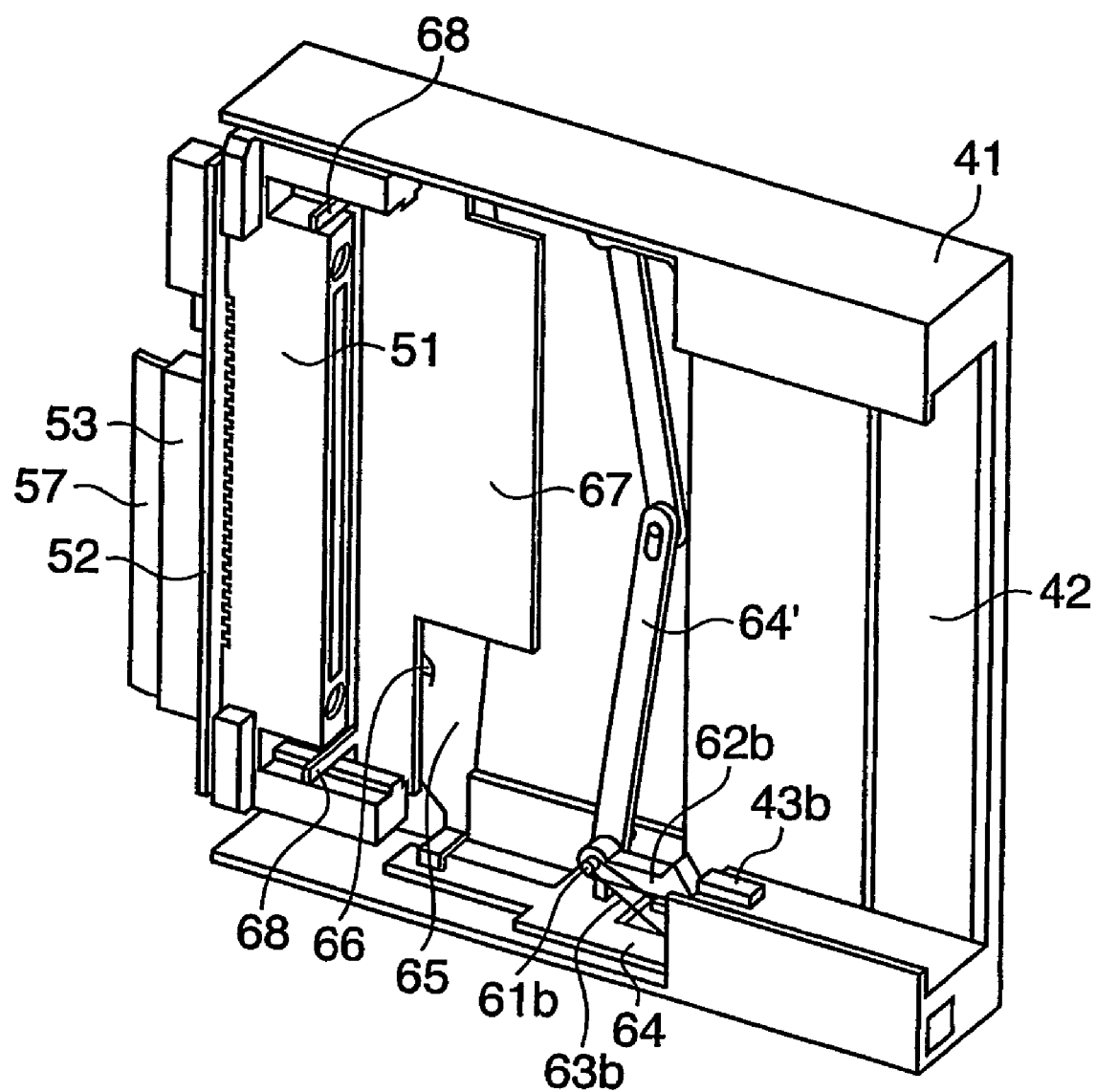
FIG. 13 is a view showing the structure of the holder portion according to the second embodiment of the present invention.

Those points of the structure of the holder portion of this embodiment which are different from the holder portion of the first embodiment will be described hereinafter. FIGS. 12 and 13 are views showing the structure of the holder portion according to the second embodiment, in which FIG. 13 shows how a cartridge is unloaded. A receptacle-side connector 51 is fixed to the socket frame 41, and forms a connecting portion which comes into electrical contact with the electrical contact terminal of a connector portion 24a or 24b of the cartridge 21a or 21b. Although other flexible cables are attached to the receptacle-side connector 51, they are not shown. A link plate 65 engages with an eject lever 64 and is pivotally attached to the socket frame 41. The link plate 65 pivots about a pivotal center 66.

An eject plate 67 engages with the link plate 65, can move in the socket frame 41 in the inserting/removing direction of the cartridge 21a or 21b, and has pushing portions 68a and 68b. The pushing portions 68a and 68b are formed by bending part of the eject plate 67 and setting it upright, and are disposed on the two sides of the receptacle-side connector 51. When the operator pushes the operating portion of the eject lever 64, as shown in FIG. 13, pawl members 62a and 62b move to open outwardly with respect to the socket frame 41. The link plate 65 engaging with the eject lever 64 pivots about the link plate pivotal center 66, so that the eject plate 67 moves toward an opening 42. Thus, the pushing portions 68a and 68b also move toward the opening 42 to push the loaded cartridge 21a or 21b, thus unloading the cartridge 21a or 21b.

Figure 14:
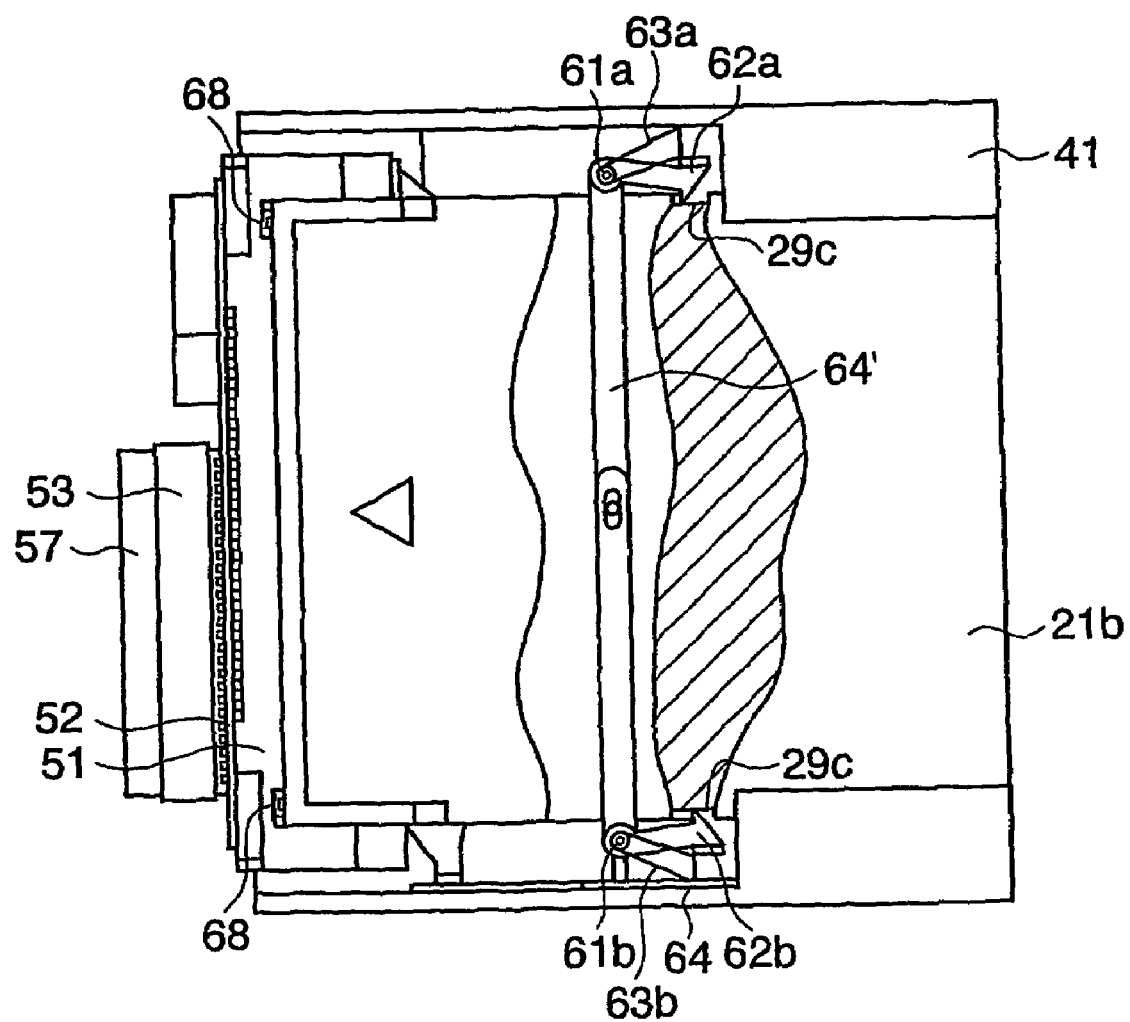
FIG. 14 is a view showing a state wherein the cartridge 21b is loaded in the holder portion of the second embodiment.

FIG. 14 is a view showing a state wherein the cartridge 21b is loaded in the holder portion. FIG. 14 is a partially cutaway view in which part of the cartridge 21b is cut away to expose the pawl members 62a and 62b, so that third vertical grooves 29c can be seen. When the cartridge 21b is inserted to a predetermined position in the socket frame 41, the position of a trailing end face 22b of the cartridge 21b is aligned with the position of the opening 42. At this time, the pawl members 62a and 62b are biased by torsion springs 63a and 63b, and the distal end portions of the members 62a and 62b engage with the third vertical grooves 29c, so that the cartridge 21b is positioned and held in the socket frame 41.

Figure 15:
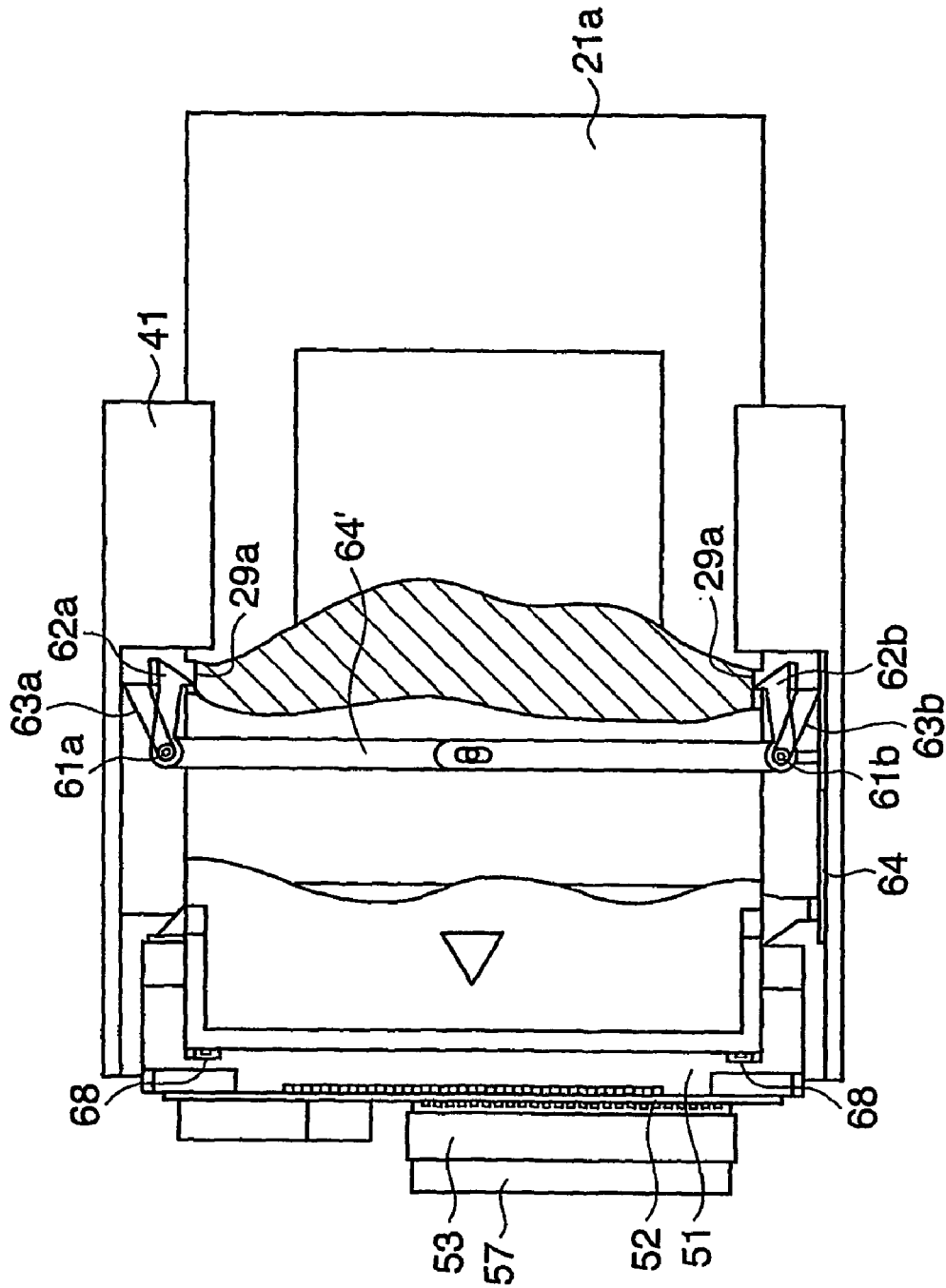
FIG. 15 is a view showing a state wherein the cartridge 21a is loaded in the holder portion of the second embodiment.

FIG. 15 is a view showing a state wherein the cartridge 21a is loaded in the holder portion. FIG. 15 is a partially cutaway view in which part of the cartridge 21a is cut away to expose the pawl members 62a and 62b, so that first vertical grooves 29a can be seen. This is the same as what is described with reference to FIG. 14. In the case of the cartridge 21a, the position of its trailing end face 22a is not aligned with the position of the opening 42. However, the pawl members 62a and 62b are biased by the torsion springs 63a and 63b, and the distal end portions of the members 62a and 62b engage with the first vertical grooves 29a, so that the cartridge 21a is positioned and held in the socket frame 41. The second embodiment is different from the first embodiment in that the pawl members 62a and 62b do not engage with the second vertical grooves 29b but do with the first vertical grooves 29a.

More specifically, first vertical grooves 29a of the cartridge 21a and the third vertical grooves 29c of the cartridge 21b are disposed at a common distance in the inserting/removing direction from the leading end portions in the inserting direction of the cartridges 21a and 21b (the sizes A1 and A2 in FIG. 4). In the second embodiment, accordingly, the pawl members 62a and 62b are disposed at the above common distance (distance with which the engaging position falls between the sizes A1 and A2 of FIG. 4) in the inserting/removing direction from the receptacle-side connector 51 with reference to the receptacle-side connector 51 serving as a positioning member which defines the leading end positions in the inserting direction of the cartridges 21a and 21b. Thus, both the cartridges 21a and 21b can be applied to the holder portion.

When the cartridge 21a or 21b is to be unloaded from the holder portion, the same operation as that described above is performed. When the eject lever 64 is operated, the pushing portions 68a and 68b move toward the opening 42, thus unloading the cartridge 21a or 21b.

<Manufacturing Method>

When the cartridges 21a and 21b of the above embodiments are to be manufactured, the second and third vertical grooves 29b and 29c (first embodiment) or the first and third vertical grooves 29a and 29c (second embodiment) to engage with the pawl members 62a and 62b provided to the holder portion, thus releasably locking the cartridges 21a and 21b, are formed at predetermined distances in the inserting/removing direction from the end portions (trailing end portion in the inserting direction in the first embodiment, and the leading end portion in the inserting direction in the second embodiment) of the cartridges 21a and 21b. The predetermined distances are set common for the cartridges 21a and 21b. Thus, the cartridges 21a and 21b can be manufactured.

Assume that the cartridges 21a and 21b are to be manufactured such that they can be applied to both the holder portion of the first embodiment and that of the second embodiment. For this purpose, regarding the cartridge 21b, the third vertical grooves 29c are formed at the first distance (B1 or B2 of FIG. 4) from one end portion (trailing end portion in the inserting direction) of the cartridge 21b, and at the second distance (A1 or A2 of FIG. 4) from the other end portion (leading end portion in the inserting direction) of the cartridge 21b. Regarding the cartridge 21a, the second vertical grooves 29b are formed at the first distance (B1 or B2 of FIG. 4) from one end portion (trailing end portion in the inserting direction) of the cartridge 21a, and at the second distance (A1 or A2 of FIG. 4) from the other end portion (leading end portion in the inserting direction) of the cartridge 21a. Also, the first vertical grooves 29a are formed at the second distance (A1 or A2 of FIG. 4) from the other end portion (leading end portion in the inserting direction) of the cartridge 21a.

The vertical grooves 29a to 29c can be formed easily when molds for producing the case portions of the cartridges 21a and 21b are formed to satisfy the relationship in size described above.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-313079 filed on Sep. 4, 2003, which is hereby incorporated by reference herein.

The invention claimed is:

1. A storage device comprising a cartridge having a storage medium, and having a holder portion in which said cartridge is detachably loaded, said holder portion being capable of being loaded with a plurality of types of cartridges having different lengths in an inserting/removing direction, wherein
said holder portion includes:
a locking portion which is disposed at a first distance in the inserting/removing direction of said cartridge from an insertion port of said cartridge, and releasably locks said cartridge, and
a positioning member which is provided to be movable in the inserting/removing direction of said cartridge, and determines a leading end position in an inserting direction of said cartridge,
said cartridge includes
a first engaging portion which is disposed at a second distance in the inserting/removing direction of said cartridge from a trailing end in the inserting direction of said cartridge, and engages with said locking portion, wherein the second distance is common among said plurality of types of cartridges, and
said plurality of types of cartridges includes a first cartridge that has a second engaging portion which is disposed at a third distance in the inserting/removing direction from a leading end in the inserting direction, and engages with a locking portion of a second storage device different from said storage device.

2. The storage device according to claim 1, wherein the first and second distances are substantially the same.

3. The storage device according to claim 1, further comprising an elastic member which constantly biases said positioning member toward the insertion port of said cartridge.

4. The storage device according to claim 1, wherein
said cartridge includes a first electrical connecting portion at said leading end portion in the inserting direction thereof, and
said holder portion has a second electrical connecting portion which is arranged at said positioning member and is connected to said first electrical connecting portion.

5. The storage device according to claim 1, wherein
said cartridge has a guide groove extending in the inserting/removing direction thereof, and
said holder portion has a guide piece which engages with the guide groove.

6. The storage device according to claim 5, wherein said first and second engaging portions are grooves intersecting the guide groove.

7. The storage device according to claim 1, wherein the storage device is an external storage device for a computer.

8. The storage device according to claim 1, wherein the storage device is a storage device incorporated in a computer.

9. The storage device according to claim 1, wherein said plurality of types of cartridges include a second cartridge, and
said first engaging portion of said second cartridge is disposed at the third distance in the inserting/removing direction of said cartridge from a leading end in the inserting direction.

10. A storage device comprising a cartridge having a storage medium and a holder portion in which said cartridge is detachably loaded, said holder portion being capable of being loaded with a plurality of types of cartridges having different lengths in an inserting/removing direction, wherein
said holder portion includes
a positioning member which determines a leading end position in an inserting direction of said cartridge, and
a locking portion which is disposed at a first distance in the inserting/removing direction of said cartridge from said positioning member, and releasably locks said cartridge,
said cartridge includes
a first engaging portion which is disposed at a second distance in the inserting/removing direction of said cartridge from a leading end in the inserting direction of said cartridge, and engages with said locking portion, wherein the second distance is common among said plurality of types of cartridges, and
said plurality of types of cartridges includes a first cartridge that has a second engaging portion which is disposed at a third distance in the inserting/removing direction from a trailing end in the inserting direction, and engages with a locking portion of a second storage device different from said storage device.

11. The storage device according to claim 10, wherein
said cartridge includes a first electrical connecting portion at said leading end portion in the inserting direction thereof, and
said holder portion has a second electrical connecting portion which is arranged at said positioning member and is connected to said first electrical connecting portion.

12. The storage device according to claim 10, wherein
said cartridge has a guide groove extending in the inserting/removing direction thereof, and said holder portion has a guide piece which engages with the guide groove.

13. The storage device according to claim 12, wherein said first and second engaging portions are grooves intersecting the guide groove.

14. The storage device according to claim 10, wherein the storage device is an external storage device for a computer.

15. The storage device according to claim 10, wherein the storage device is a storage device incorporated in a computer.

16. The storage device according to claim 10, wherein said plurality of types of cartridges include a second cartridge, and said first engaging portion of said second cartridge is disposed at the third distance in the inserting/removing direction of said cartridge from a trailing end in the inserting direction.

17. A cartridge which is detachably loaded in a holder portion in a storage device outside a computer or a storage device incorporated in a computer and has a storage medium, comprising a connecting portion being electrically connected to said storage device, a first engaging portion which engages with a locking portion provided to said holder portion to releasably lock said cartridge, and is arranged at a first distance in an inserting/removing direction from an end of said cartridge, the first distance being set common for another cartridge which is detachably loaded in said holder portion and has a length different from that of said cartridge in the inserting/removing direction, and a second engaging portion which engages with a locking portion provided to a second holder portion different from said holder portion and is arranged at a second distance in the inserting/removing direction from another end of said cartridge.

18. A cartridge manufacturing method of manufacturing a plurality of cartridges which are detachably loaded in a holder portion for a storage device outside a computer or a storage device incorporated in a computer and have a storage media, the cartridges having different lengths in an inserting/removing direction, comprising providing a first engaging portion at a first distance in the inserting/removing direction from an end of the cartridge, the first engaging portion engaging with a locking portion provided to the holder portion to releasably lock the cartridge, providing a second engaging portion at a second distance in the inserting/removing direction from another end of the cartridge, the second engaging portion engaging with a locking portion provided to a second holder portion different from said holder portion to releasably lock the cartridge, and the second engaging portion provided with a part of the plurality of cartridges, and setting the first distance common among the plurality of types of cartridges.

* * * * *